(12) United States Patent
Larsson

(10) Patent No.: US 6,264,088 B1
(45) Date of Patent: Jul. 24, 2001

(54) WELDING ASSEMBLY FOR FRICTION STIR WELDING

(75) Inventor: Rolf Larsson, Laxå (SE)

(73) Assignee: Esab AB, Göteborg (SE)

( * ) Notice: Subject to any disclaimer, the term of this patent is extended or adjusted under 35 U.S.C. 154(b) by 0 days.

(21) Appl. No.: 09/423,875

(22) PCT Filed: May 12, 1998

(86) PCT No.: PCT/SE98/00861

§ 371 Date: Feb. 1, 2000

§ 102(e) Date: Feb. 1, 2000

(87) PCT Pub. No.: WO98/51441

PCT Pub. Date: Nov. 19, 1998

Related U.S. Application Data
(60) Provisional application No. 60/047,133, filed on May 20, 1997.

(30) Foreign Application Priority Data
May 16, 1997 (SE) .................................................. 9701865

(51) Int. Cl.$^7$ .................................................. B23K 20/12
(52) U.S. Cl. .......................................... 228/2.1; 228/112.1
(58) Field of Search ................... 228/112.1, 2.1, 228/2.3; 156/73.5

(56) References Cited
U.S. PATENT DOCUMENTS

| | | | |
|---|---|---|---|
| 5,611,479 | * | 3/1997 | Rosen .................... 228/112.1 |
| 5,713,507 | * | 2/1998 | Holt et al. ................ 228/112.1 |
| 5,718,366 | * | 2/1998 | Colligan ................. 228/112.1 |
| 5,813,592 | * | 9/1998 | Midling et al. ............ 228/112.1 |
| 5,893,507 | * | 4/1999 | Ding et al. ................. 228/2.1 |
| 6,019,013 | * | 2/2000 | Luik .................... 74/490.01 |
| 6,050,474 | * | 4/2000 | Aota et al. .............. 228/112.1 |
| 6,050,475 | * | 4/2000 | Kinton et al. ........... 228/112.1 |
| 6,053,391 | * | 4/2000 | Heideman et al. .......... 228/2.1 |
| 6,070,784 | * | 6/2000 | Holt et al. ............... 228/112.1 |
| 6,138,895 | * | 10/2000 | Oelgoetz et al. ......... 228/112.1 |

FOREIGN PATENT DOCUMENTS

| | | | |
|---|---|---|---|
| 0928659 A1 | * | 7/1999 | (EP) . |
| 2306366A | | 5/1997 | (GB) . |
| WO93/10935 | | 6/1993 | (WO) . |
| WO95/26254 | | 10/1995 | (WO) . |
| WO 97/48517 A1 | * | 12/1997 | (WO) . |
| WO 98/13167 A1 | * | 4/1998 | (WO) . |
| WO 99/34951 A1 | * | 7/1999 | (WO) . |
| WO 99/39861 A1 | * | 8/1999 | (WO) . |
| WO 00/2699 A1 | * | 1/2000 | (WO) . |

* cited by examiner

Primary Examiner—Tom Dunn
Assistant Examiner—Colleen Cooke
(74) Attorney, Agent, or Firm—Burns, Doane, Swecker & Mathis, L.L.P.

(57) ABSTRACT

The invention relates to a welding assembly for joining together workpieces (1, 2) along a joint between said pieces by means of friction stir welding. The welding assembly comprises a welding probe (9) intended to be advanced along said joint during the welding operation. The welding probe comprises a body (10) and a pin (20), the body being arranged to be pressed against the upper faces of the workpieces during the welding operation whereas the pin is arranged to be moved along said joint during the welding while being rotated and pressed against said workpieces. The pin (20) and the body (10) are also so arranged relative to one another as to be mutually movable, allowing said pin and said body to perform different movement patterns relative to one another.

21 Claims, 3 Drawing Sheets

WELDING ASSEMBLY FOR FRICTION STIR WELDING

This is a national phase filing of International Application No. PCT/SE98/00861, filed May 12, 1998 that was published in English, and claims priority under 35 U.S.C. §119 for Swedish Application No. 9701865-9 filed May 16, 1997, and U.S. Provisional Application No. 60/047,133 filed May 20, 1997.

The present invention relates to a welding assembly for joining together workpieces along a joint between said pieces by means of friction stir welding, said welding assembly comprising a welding probe intended to be advanced along said joint during the welding operation and comprising a body and a pin, the body being arranged to be pressed against the upper faces of the workpieces during the welding operation whereas the pin is arranged to be moved along said joint during the welding while being rotated and pressed against said workpieces.

The definition friction stir welding designates a welding method according to which the workpieces to be joined together are plasticized along their joint line by supply of frictional heat from a rotating welding probe, said probe being moved along the joint between the workpieces while at the same time being pressed against the workpieces. As described in WO93/10935 and WO95/26254 the welding probe should be manufactured from a material that is harder than that of the workpieces, and during the welding operation the workpieces should be securely fixed relative to one another and to the work-table. In this respect this technique differs from that of conventional friction welding according to which the frictional heat is generated by the relative motion of the workpieces as they are being pressed together, i.e. the frictional heat is generated only by the two components to be joined together. This friction stir welding technique according to the above-mentioned publications may be used for the welding of different materials, such as plastics, metals, etcetera in various fields of application, for example to join workpieces together, to repair cracks in a workpiece, and so on. The design of the welding probe is conditioned e.g. by the material to be welded and by the intended application.

One of the problems encountered in the implementation of the welding method described in the above patent specifications for joining together e.g. aluminium profile sections is that vertically, the welding probe in principle must extend through the entire joint between the workpieces to be welded together in order to ensure that the resulting weld will extend all the way from the top to the lower faces of the workpieces, i.e. that a complete-penetration weld is produced. The welding probes disclosed in the above patent specifications are in the form of a rotatable, essentially cylindrical body the upper part of which is connected to a drive unit and the lower part of which is provided with a co-rotating pin. The essential difference distinguishing the probe according to WO93/10935 from that of WO95/26254 is that according to the former the body and the pin of the probe form one integral piece whereas according to the latter they are two separate pieces. In accordance with the latter patent specification the body and the pin are, however, securely interconnected during the welding operation proper. Accordingly, the entire welding probe or at least the pin thereof must be exchanged according to the latter specification in order to allow workpieces of different thicknesses to be welded together.

An additional problem is that the thickness of the workpieces to be joined together may vary along the joint, and consequently the end product will not be formed with a weld that extends all the way through the joint, i.e. the joining-together operation will not result in an acceptable weld.

A further problem encountered in prior-art welding probes is the formation of an exit aperture at the point where the probe is lifted off the produced weld following completion of the welding operation.

Another problem is that presently existing welding probes precludes any supply of additional material during the welding operation proper, which supply is desirable when one wishes that the body be pressed against the top faces of the workpieces without the lower part of the body, i.e. its so called shoulder, entering into the workpieces.

One object of the present invention thus is to provide a welding assembly to be used for friction stir welding operations that in a convenient and rapid manner may be adapted to different thicknesses in the workpieces to be joined together or may adjust itself to thickness variations in the workpieces.

A further object of the present invention is to provide a welding assembly of the kind referred to which allows supply of additional material during the welding operation.

These objects are achieved in accordance with the present invention in a welding assembly for use in friction stir welding of the kind defined in the introduction, which probe is characterised in that the pin and the body are so arranged relative to one another as to be mutually movable, allowing said pin and body to perform different movement patterns relative to one another.

As a consequence of the probe of the welding assembly being constructed in the form of a pin and a body that are so disposed relative to one another as to be mutually movable, whereby they are allowed to perform mutually different movement patterns, any material that is plasticized during the welding operation will be safely retained below the lower part of the body, and consequently the position of the pin relative to the joint may be adjusted in a manner ensuring that a complete-penetration weld will be produced in the full extension of the joint.

Advantageous modified embodiments of this welding assembly are defined in the dependent claims.

The invention will be described in more detail in the following with reference to the accompanying drawings, wherein FIG. 1 is a lateral view of an apparatus designed for friction stir welding and comprising a welding assembly in accordance with the present invention.

Figure 1:
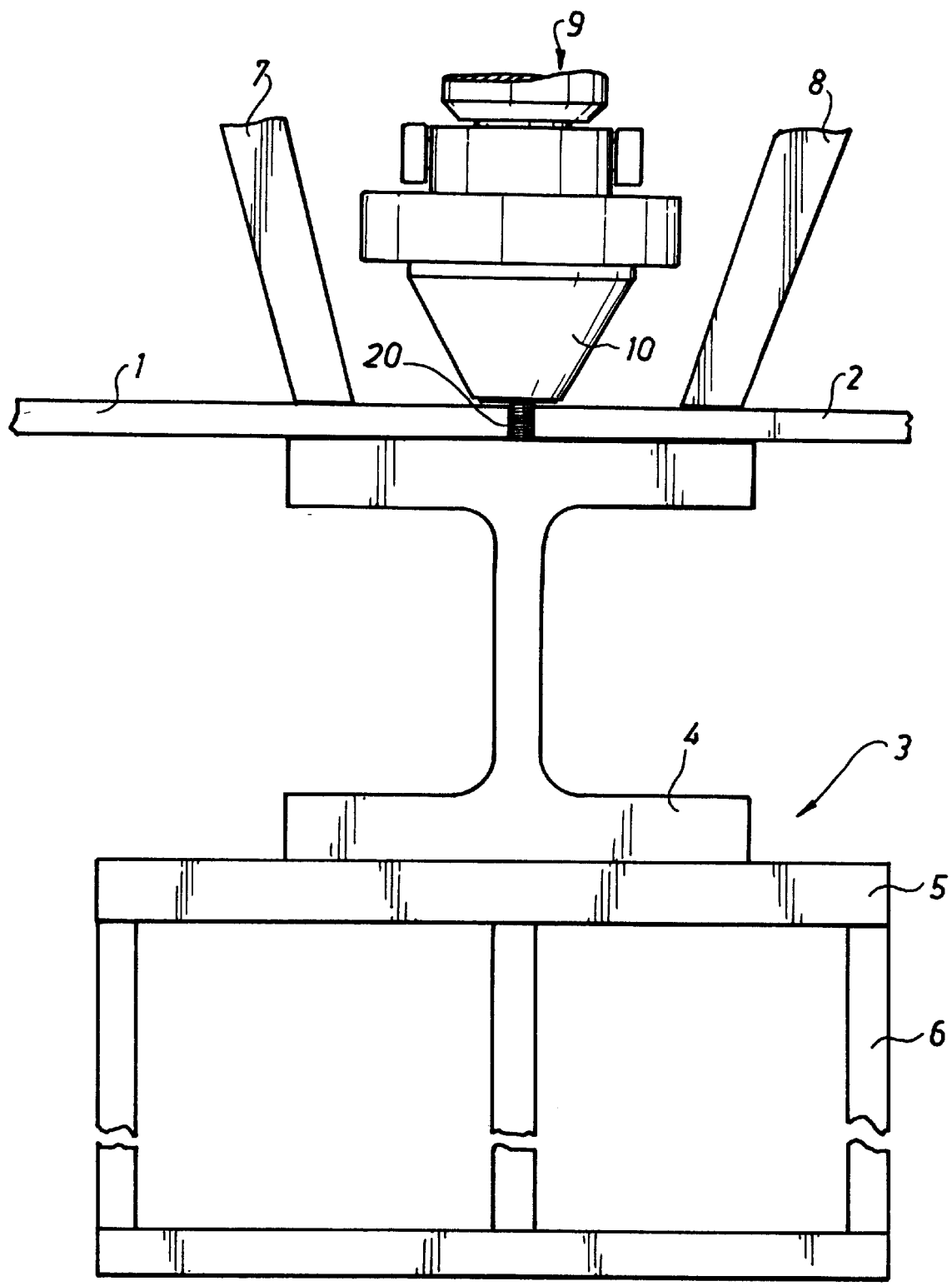

The device illustrated in FIG. 1 is intended to be used to join together two workpieces 1, 2 in the form of e.g. two extruded aluminium profile sections by means of friction stir welding. The device comprises a work-table having a backing bar 4 in the form of an I-beam, a horizontally extending machine table 5 and a stationary, rigid frame 6. The device also comprises a number of clamping means 7 and 8 designed to clampingly secure the workpieces 1 and 2 to one another and to the work-table 3 during the welding operation. Each clamping means 7 and 8 could be a pressure element that is connected to a pressure cylinder. The device likewise comprises a welding assembly formed with a welding probe 9 and a drive unit, not shown, to advance the welding probe along an existing joint between the workpieces.

Figure 2:
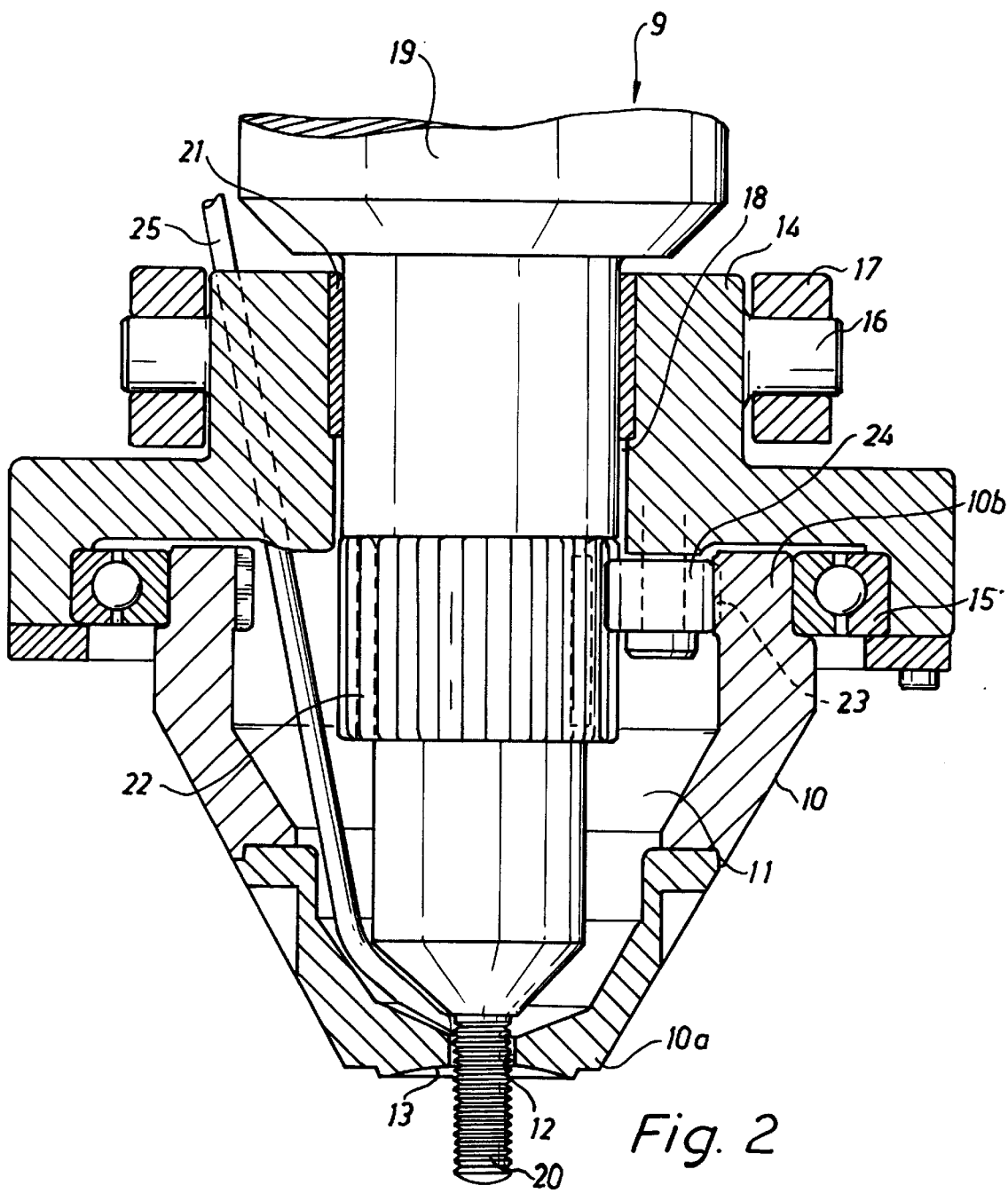
FIG. 2 is a cross-sectional view on an enlarged scale of a first embodiment of a welding probe incorporated in said welding assembly.

As most clearly apparent from FIG. 2, the welding probe 9 is formed as an essentially conical rotationally symmetrical body 10 having an inner cavity 11 and an end-to-end bore 12 disposed in the center of the lower tapering end 10a of the body. Owing to its appearance, this end 10a will be referred to in the following as the shoulder. The outer portion of the shoulder is configured with a concave bottom face 13 at the centre of which debouches the bore 12. At the upper enlarged end of the body 10, a bearing 15 rotationally interconnects the body and a intermediate member 14. This intermediate member 14 is provided at its upper end with two pivot pins 16, each mounted in a fork-shaped support 17 designed to lower and raise the intermediate member, and consequently the body 10, vertically. The intermediate member 14 is also formed with a cavity 18 which debouches into the cavity 11 of the body 10.

A rotary spindle 19 at the lower end of which is mounted a conically shaped threaded pin 20 is housed in the cavities 18 and 11 in such a manner that the pin 20 protrudes from the bore 12 in the shoulder 10a. A circumferential bearing 21 interconnects the spindle 19 and the intermediate member 14 and opposite the widened part 10b of the body 10 the spindle 19 supports an exterior gear ring 22. The widened part 10b likewise supports an interior gear ring 23 on the upper part of its inner face, said gear ring 23 being in contact with the exterior gear ring 22 by means of a number of free-running gear wheels 24, for instance six such wheels. Owing to this arrangement,. the spindle 19 is able to rotate the pin 20 as well as the shoulder 10a, although at different rotational speeds, depending on the number of teeth on the gear rings 22 and 23, and in opposite directions.

As likewise appears from the drawing figure a supply means 25 is provided in the form of an elongate pipe extending through the intermediate member 14 and the cavity 11 of the body 10 so as to debouch exactly above the bore 12. At its lower end,. the pipe is bent at an angle to allow it to be accommodated between the inner upper part of the shoulder and the lower conically shaped end of the spindle.

From FIG. 1 likewise appears that the body shoulder 10a is urged against the top faces of workpieces 1 and 2 during the welding operation, whereas the pin 20, while rotating, is advanced in the joint while being pressed against the workpieces.

Figure 3:
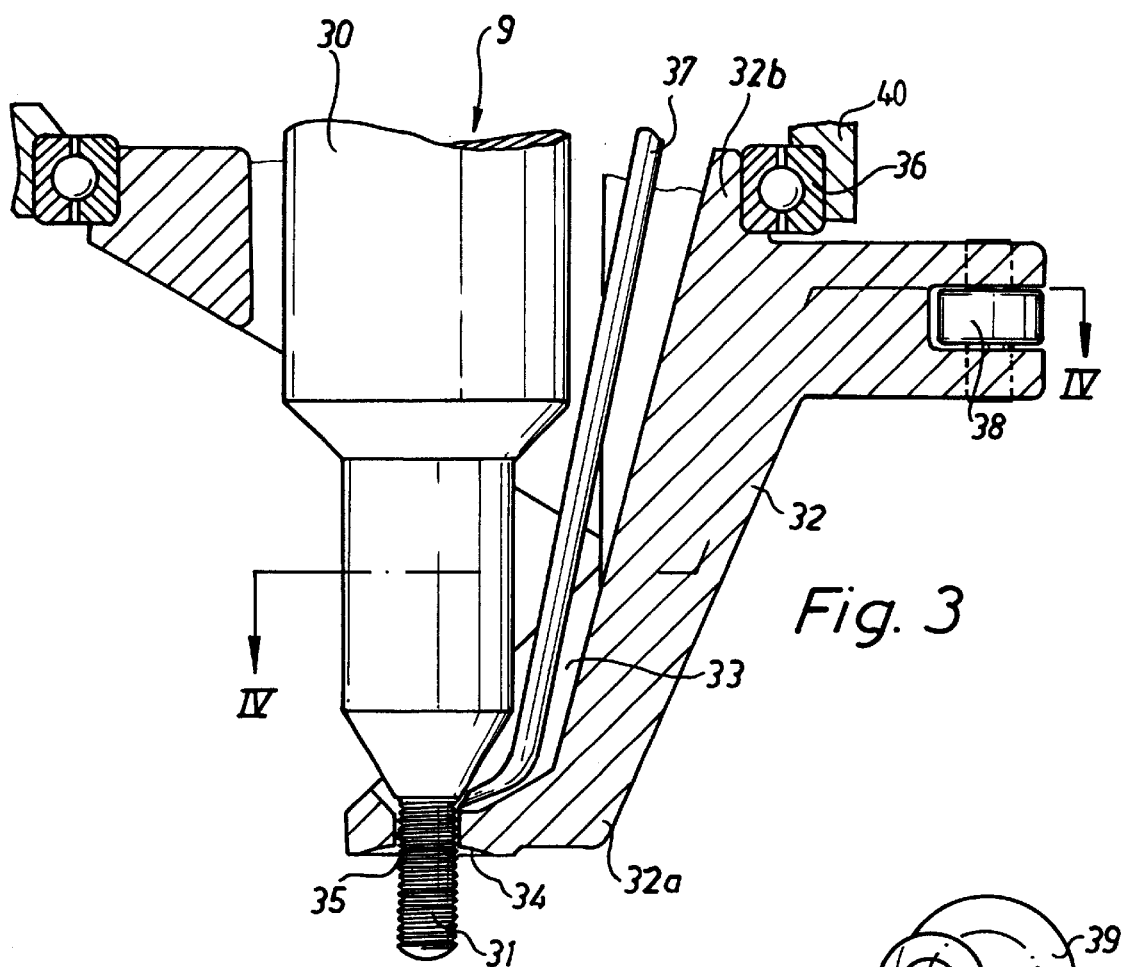
FIG. 3 is a cross-sectional view on an enlarged scale of a second embodiment of the welding probe.
Figure 4:
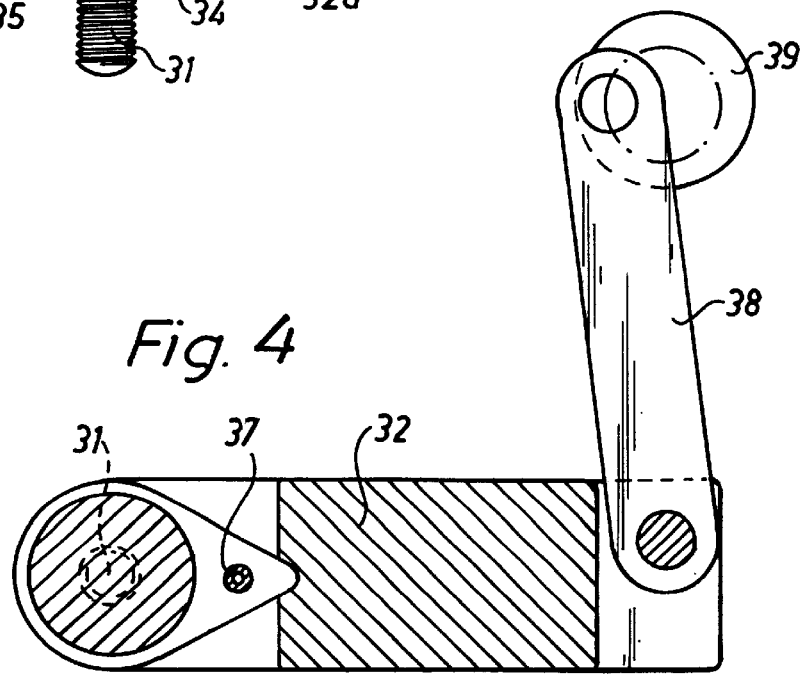
FIG. 4 is a section taken on line IV—IV through the welding probe shown in FIG. 3.

The welding probe 9 in accordance with the embodiment of FIGS. 3 and 4, like that of FIG. 2, consists of a rotary spindle 30 on the lower part of which is mounted a rotary threaded pin 31. However, the body 32 is asymmetrical and is not arranged to rotate but to oscillate relative to the pin 31. As also appears from FIG. 4. the body is in the shape of a cone from the lower part of which a portion has been removed to form a lower shoulder-like end 32a. The body is also formed with an internal cavity 33 and an upper widened end 32b. At its lower end the shoulder is configured so as to comprise a concave bottom 34 into the centre of which debouches a bore 35. Like in accordance with the previous embodiment, the pin 31 protrudes from this bore.

At its upper widened end 32b the body is rotatably connected to a stationary intermediate member 40 by means of a bearing 36.

As likewise appears from FIG. 3 a supply means 37 in the shape of an elongate pipe is provided, said pipe extending through the intermediate member 40 and the cavity 33 of the body 32 so as to debouch exactly above the bore 35. The lower pipe end is bent at an angle to allow it to be accommodated between the inner upper part of the shoulder and the lower conically shaped end of the spindle.

As appears particularly from FIG. 4, the upper right-hand part of the body 32 is provided with a link 38 the opposite end of which is connected to a rotary eccenter shaft 39. Owing to this arrangement, the body 32 may be given an oscillating motion in the horizontal plane relative to the top faces of the workpieces 1 and 2 instead of a rotary motion, as is the case in the first embodiment. However, both motions will cause frictional heat to generate between the shoulder and the top faces of the workpieces. Also in this case it is possible to mount a cutting tool on the oscillating shoulder for the purpose of post-treating the welded surface.

When the workpieces 1 and 2 are to be joined together by means of friction stir welding, the workpieces 1 and 2 are initially secured by means of the clamping means 7 and 8, care being taken that the joint, i.e. the air gap, between the facing end edges of the workpieces does not exceed dimensions that are liable to cause a deficient weld to form. A drive motor, not shown, then causes the spindle 19 or 30 to rotate while at the same time the entire welding probe 9 is made to move at a predetermined speed along the joint, propelled by the above mentioned drive unit. Also the body 10 will be made to rotate in the opposite direction of rotation as the pin 20 but at a different speed. As mentioned previously, the body 32 will instead perform an oscillating motion. Thus, the pin and the body, in accordance with both embodiments, are arranged in such a manner relative to one another as to move in different motion patterns during the welding operation. The frictional heat generated by the motions of the body and the shoulder will, as described initially, cause the end edges of the workpieces to plasticize while at the same time they are secured by the clamping means 7 and 8.

In order to achieve a complete-penetration weld along the entire joint, irrespective of varying thicknesses in the workpieces to be joined together, a servo mechanism, not shown, is connected to the welding prove in such a manner as to cause the relative positions between the pin and the shoulder to vary vertically in response to said thickness variations, ensuring that in principle the pin extends through the entire joint for the duration of the welding operation, i.e. that the distance by which the pin protrudes below the shoulder corresponds to the depth of the joint. The different movement patterns of the shoulder and the pin, respectively, ensure that any material that is plasticized by the frictional heat is safely retained underneath the shoulder and is prevented from entering into the bore 12 or 35 between the pin and the shoulder, and as a result the position of the pin vertically may change without problem during the entire welding operation.

The external threading of the pins 20 and 31 causes the material that is plasticized during the welding operation by the frictional heat generated during that operation to flow in the longitudinal direction of the pin, so called pumping effect. In accordance with the first embodiment this pumping effect is enhanced owing to the rotation of the body and the pin in opposite directions. The pumping effect is further improved if in addition thereto the bore 12, respectively, of the bodies are threaded. This pumping effect in combination with the above-described relative motion of the pin and the shoulder also makes it possible to feed added material that is supplied to the upper mouths of the bore 12, respectively, down through the shoulder and into the joint to provide surplus material when the material of the workpieces as such is insufficient, either to fill the exit crater formed when the pin is lifted off the formed weld at the end of the welding operation, or to be supplied between the top faces of the workpieces and the shoulder, or to prevent the shoulder from entering into the top faces of the workpieces. In the latter case the body, like in the previously described case, is pressed against the top faces of the workpieces but via added intermediary material.

In order to prevent the material that is plasticized during the welding operation from producing a permanent bond between the body and the pin on cooling following the welding operation, the body and the pin are interconnected in such a manner as to be coaxially displaceable vertically relative to one another. Either the pin may be lifted off the bore in the shoulder after each individual welding operation or else the upper pin end which is connected to the spindle may be formed with a neck portion having a considerably smaller diameter than said bore, an arrangement which prevents weld metal from bonding the parts together during the cooling step.

In order to obtain the desired welding temperature more rapidly it is possible to supply extra heat prior to and/or during the welding operation. It is likewise possible to supply the body and/or the pin with extra heat during and/or after the welding operation to prevent that the body and the pin from being permanently bonded to one another by the plasticized material that forms during the welding operation.

It should be appreciated that the invention is not limited to the embodiment described and shown herein but could be modified in a variety of ways within the scope of the appended claims. For example, the body and the pin could be arranged to rotate in the same direction at the same or at different speeds. Alternatively, the body and the pin could be arranged to rotate at the same mean speed but in pulsating rotary mode, making relative motions between the body and the pin possible during substantially the entire welding operation. The differentiated motion patterns could also be achieved by making the body immobile, i.e. stationary, during the welding operation. In this case it is necessary to heat the body electrically or with the aid of a heat-carrying medium to compensate for the heat lost because in this case the stationary body does not produce any frictional heat. Also when the body is not stationary, e.g. oscillates, it may be necessary to supply additional heat because the produced frictional heat may not be sufficient to satisfactorily plasticize the end edges of the workpieces.

What is claimed is:

1. A welding assembly for joining together workpieces (1, 2) along a joint between said pieces by means of friction stir welding, said welding assembly comprising a welding probe (9) intended to be advanced along said joint during the welding operation and comprising a body (10; 32) and a pin (20; 31), the body being arranged to be pressed against the upper faces of the workpieces during the welding operation whereas the pin is arranged to be moved in said joint during the welding while being rotated and pressed against said workpieces, characterised in that the pin (20; 31) and the body (10; 32) are so arranged relative to one another as to be mutually movable, allowing said pin and said body to perform different movement patterns relative to one another.

2. A welding assembly as claimed in claim 1, characterised in that the pin (20; 31) is arranged to rotate in an end-to-end bore (12; 35) in the body (10; 32) in such a manner that the distance by which the pin is allowed to protrude below the body corresponds to the depth of the joint in each point along the joint during the entire welding operation.

3. A welding assembly as claimed in claim 1, characterised in that the pin (20; 31) has external threads in order to allow a flow directed in the longitudinal direction of the pin, so called pumping effect, of the material that is plasticized during the welding operation by the frictional heat generated during that operation, and/or of any additional material that is arranged to be supplied to the joint.

4. A welding assembly as claimed in claim 1, characterised in that also the body (10; 32) is rotatable during the welding operation.

5. A welding assembly as claimed in claim 1, characterised in that the body (10; 32) and the pin (20; 31) are arranged to rotate in opposite directions and/or at different speeds relative to one another.

6. A welding assembly as claimed in claim 1, characterised in that the body (10; 32) and the pin (20; 31) are arranged to rotate at the same mean rotational speed but in a pulsating rotary mode, whereby a relative movement between the body and the pin may be obtained during substantially the entire welding operation.

7. A welding assembly as claimed in claim 1, characterised in that the body (10; 32) is arranged to oscillate during the welding operation.

8. A welding assembly as claimed in claim 1, characterised in that the body (10; 32) is stationary during the welding operation.

9. A welding assembly as claimed in claim 1, characterised in that the body (10; 32) is arranged to be heated by supply of external energy in order to provide heat necessary to the welding operation in addition to the frictional heat generated by the pin (20; 31) during the welding operation.

10. A welding assembly as claimed in claim 1, characterised in that the body (10; 32) and the pin (20; 31) are interconnected in such a manner as to be coaxially displaceable relative to one another to allow the pin and the body to so move relative to one another after the welding operation that any plasticized material that forms during the welding operation is prevented from forming a permanent bond between body and pin during cooling following the welding operation.

11. A welding assembly as claimed in claim 1, characterised in that additional heat is supplied to the body (10; 32) and/or to the pin (20; 31) prior to and/or during the welding operation to more rapidly achieve the desired welding temperature.

12. A welding assembly as claimed in claim 1, characterised in that additional heat is supplied to the body (10; 32) and/or to the pin (20; 31) during and/or after the welding operation to prevent plasticized material that forms during the welding operation from forming a permanent bond between the body and the pin.

13. A welding assembly as claimed in claim 2, characterisedin that additional material is arranged to be supplied to the joint and/or to the top faces of the workpieces (1, 2) by means of a supply means debouching adjacent the bore (12; 35) formed in the body.

14. A welding assembly as claimed in claim 7, characterised in that a tool designed for working on the produced weld joint surface is attached to the rear part of the body (10; 32).

15. A welding assembly as claimed in claim 2, characterised in that the pin (20; 31) has external threads in order to allow a flow directed in the longitudinal direction of the pin, so called pumping effect, of the material that is plasticized during the welding operation by the frictional heat generated during that operation, and/or of any additional material that is arranged to be supplied to the joint.

16. A welding assembly as claimed in claim 2, characterised in that also the body (10; 32) is rotatable during the welding operation.

17. A welding assembly as claimed in claim 3, characterised in that also the body (10; 32) is rotatable during the welding operation.

18. A welding assembly as claimed in claim 2, characterised in that the body (10; 32) and the pin (20; 31) are arranged to rotate in opposite directions and/or at different speeds relative to one another.

19. A welding assembly as claimed in claim 3, characterised in that the body (10; 32) and the pin (20; 31) are arranged to rotate in opposite directions and/or at different speeds relative to one another.

20. A welding assembly as claimed in claim 2, characterised in that the body (10; 32) and the pin (20; 31) are arranged to rotate at the same mean rotational speed but in a pulsating rotary mode, whereby a relative movement between the body and the pin may be obtained during substantially the entire welding operation.

21. A welding assembly as claimed in claim 2, characterised in that the body (10; 32) is arranged to oscillate during the welding operation.

* * * * *